United States Patent
Handa et al.

(10) Patent No.: US 6,445,646 B1
(45) Date of Patent: Sep. 3, 2002

(54) SIGNAL PROCESSING METHOD AND APPARATUS, AND SONAR SYSTEMS

(75) Inventors: Minoru Handa; Hideharu Morimatsu; Yasushi Nishimori; Mitsuaki Watanabe, all of Nishinomiya (JP)

(73) Assignee: Furuno Electric Company, Limited, Hyogo-ken (JP)

( * ) Notice: Subject to any disclaimer, the term of this patent is extended or adjusted under 35 U.S.C. 154(b) by 11 days.

(21) Appl. No.: 09/628,548

(22) Filed: Jul. 28, 2000

(30) Foreign Application Priority Data

Jul. 28, 1999 (JP) .............................. 11-213446

(51) Int. Cl.[7] ................................................ G01S 3/80
(52) U.S. Cl. ...................... 367/105; 367/103; 367/123
(58) Field of Search .................................. 367/103, 105, 367/123, 124, 125, 126, 129

(56) References Cited

U.S. PATENT DOCUMENTS 3,835,448 A * 9/1974 Bertheas ...................... 367/103
4,166,999 A * 9/1979 Brady, III .................... 367/105
5,544,128 A * 8/1996 Kim et al. .................... 367/103
5,787,049 A * 7/1998 Bates .......................... 367/103

FOREIGN PATENT DOCUMENTS

| EP | 0266998 | 5/1988 |
| EP | 0388215 | 9/1990 |
| EP | 702349 A2 | 3/1996 |
| EP | 859242 A1 | 8/1998 |

* cited by examiner

Primary Examiner—Ian J. Lobo

(57) ABSTRACT

Signals entered from receiving transducer elements of 160 channels are multiplexed into 10 signal lines by 10 multiplexers. Each of 10 A/D converters converts the signals of 16 channels from analog from into digital form. The multiplexers are switched with synchronized switching timing to produce 10 pieces of sample data strings with the same timing. 160 pieces of sample data sampled in a steplike form are shifted in phase according to an oblique-line sampling scheme. The signal of the same channel is sampled twice with a phase delay of 90° so that the signal can be converted into complex-valued sample data without increasing the number of processing circuits.

21 Claims, 12 Drawing Sheets

SIGNAL PROCESSING METHOD AND APPARATUS, AND SONAR SYSTEMS

BACKGROUND OF THE INVENTION

The present invention relates to a signal processing method and a signal processing apparatus for use in such systems as communications equipment, sonar systems, ultrasonic diagnostic apparatus and ultrasonic flaw detectors. The invention also pertains to scanning sonars as well as to a sea bottom mapping sonar employing a crossed fan beam technique. A scanning sonar scans a wide range of directions by forming receiving beams in sequentially varying directions The present invention will be explained hereinafter as embodied in a sea bottom mapping sonar which is a crossed fan beam type sonar system as a typical example of application of the invention.

A conventionally known crossed fan beam type bottom mapping sonar forms desired receiving beams by phasing echo signals individually received by 160 transducer elements by specific amounts and then combining the phased signals through an analog operation by using 160 mixers, for example.

Since the conventional bottom mapping sonar comprises a large number of transducer elements and receiving channels in its input stage, it has such problems that this sonar system inevitably becomes large-sized and its potential to achieve a high range resolution is more or less limited due to differences in the characteristics of analog circuits or their deterioration with the lapse of time.

SUMMARY OF THE INVENTION

An object of the present invention is to provide a signal processing method and a signal processing apparatus applicable to such systems as communications equipment, sonar systems, ultrasonic diagnostic apparatus and ultrasonic flaw detectors whose circuit configuration is simplified by a time-division multiplexing technique.

Another object of the invention is to provide a crossed fan beam type bottom mapping or detecting sonar system using the signal processing method and the signal processing apparatus of the invention.

Another object of the invention is to provide a sonar system, in particular a scanning sonar, which scans a wide range of directions by forming receiving beams in sequentially varying directions using the signal processing method and the signal processing apparatus of the invention.

In one aspect of the invention, a signal processing method comprises the steps of receiving signals of a specific frequency f which is equal to $1/T$ where T is the period of the signals, sampling the signals at a specific first sampling time instant and at a sampling time instant $(a+1/4)T$ after the first sampling time instant where a is 0 or an integer multiple of 0.5, and outputting data sampled at the sampling time instants as in-phase data and quadrature data of complex-valued sample data.

Preferably, the time interval of $(a+1/4)T$ is smaller than half the recurrence interval of a point of the specific first sampling time instant.

In another aspect of the invention, a signal processing method comprises the steps of receiving signals of a specific frequency f which is equal to $1/T$ where T is the period of the signals, sampling the signals at a specific first sampling time instant, at a sampling time instant $(n+1/4)T$ after the first sampling time instant, at a sampling time instant $(n+1/2)T$ after the first sampling time instant and at a sampling time instant $(n+3/4)T$ after the first sampling time instant to produce 0° sample data, 90° sample data, 180° sample data and 270° sample data respectively, where n is 0 or a positive integer, and outputting a value obtained by averaging the 0° sample data and the 180° sample data as in-phase data of complex-valued sample data and a value obtained by averaging the 90° sample data and the 270° sample data as quadrature data of the complex-valued sample data.

Preferably, the time interval of $(n+1/4)T$ is smaller than one quarter of the recurrence interval of a point of the specific first sampling time instant.

In another aspect of the invention, a signal processing device comprises a plurality of signal input means, a plurality of multiplexers which multiplex signals entered from the signal input means into a smaller number of channels having output terminals than the number of the signal input means, wherein the multiplexers operate with synchronized switching timing, and a plurality of A/D converters respectively connected to the output terminals of the multiplexers which convert analog signals entered respectively and individually from the multiplexers into digital form, wherein the A/D converters operate with synchronized sampling timing.

In still another aspect of the invention, a signal processing device comprises a plurality of signal input means for inputting signals having a specific frequency, a plurality of multiplexers which multiplex the signals entered from the signal input means into a smaller number of channels having output terminals than the number of the signal input means, wherein the multiplexers operate with synchronized switching timing, a plurality of A/D converters respectively connected to the output terminals of the multiplexers which convert analog signals entered respectively and individually from the multiplexers into digital form, wherein the A/D converters operate with synchronized sampling timing, and a phase shifter which shifts the phases of individual sample data such that a specific phase relationship is established between the data sampled by the A/D converters.

In yet another aspect of the invention, a sonar system which emits an ultrasonic search pulse signal and receives echo signals by receiving beams formed successively and oriented in successively varying directions comprises a plurality of transducer elements for receiving echo signals of a specific frequency f which is equal to $1/T$ where T is the period of the echo signals, a plurality of multiplexers which multiplex signals entered from the transducer elements into a smaller number of channels than the number of the transducer elements, wherein the multiplexers operate with synchronized switching timing, a plurality of A/D converters which convert analog signals entered respectively and individually from the multiplexers into digital form, wherein the A/D converters operate with synchronized sampling timing and sample the analog signals at a specific first sampling time instant, at a sampling time instant $(n+1/4)T$ after the first sampling time instant, at a sampling time instant $(n+1/2)T$ after the first sampling time instant and at a sampling time instant $(n+3/4)T$ after the first sampling time instant to produce 0° sample data, 90° sample data, 180° sample data and 270° sample data respectively, where n is 0 or a positive integer, outputting a value obtained by averaging the 0° sample data and the 180° sample data as in-phase data of complex-valued sample data and a value obtained by averaging the 90° sample data and the 270° sample data as quadrature data of the complex-valued sample data, a phase shifter shifts the phases of individual sample data such that a specific phase relationship is established between the complex-valued sample data derived from the individual transducer elements, and a matched filter for receiving the complex-valued sample data from the phase shifter and successively forming the receiving beams in different directions.

In yet another aspect of the invention, a sonar system which emits an ultrasonic search pulse signal and receives echo signals by receiving beams formed successively and oriented in successively varying directions comprises a plurality of transducer elements for receiving echo signals of a specific frequency, a plurality of multiplexers which multiplex signals entered from the transducer elements into a smaller number of channels than the number of the transducer elements, wherein the multiplexers operate with synchronized switching timing, a plurality of A/D converters which convert analog signals entered respectively and individually from the multiplexers into digital form, wherein the A/D converters operate with synchronized sampling timing and sample the analog signals for a plurality of waves thereof from the transducer elements to produce 0° sample data, 90° sample data, 180° sample data and 270° sample data of echo signals from each of the transducer elements respectively, outputting a value obtained by averaging the 0° sample data and the 180° sample data as in-phase data of complex-valued sample data and a value obtained by averaging the 90° sample data and the 270° sample data as quadrature data of the complex-valued sample data, a phase shifter shifts the phases of individual sample data such that a specific phase relationship is established between the complex-valued sample data derived from the individual transducer elements, and a matched filter for receiving the complex-valued sample data from the phase shifter and successively forming the receiving beams in different directions.

In yet another aspect of the invention, a sonar system which emits an ultrasonic search pulse signal and receives echo signals by receiving beams formed successively and oriented in successively varying directions comprises a plurality of transducer elements for receiving echo signals of a specific frequency, a plurality of multiplexers which multiplex signals entered from the transducer elements into a smaller number of channels than the number of the transducer elements, a plurality of A/D converters which convert analog signals entered respectively and individually from the multiplexers into digital form, means for successively generating in a sequential order in-phase data of complex-valued sample data and quadrature data of complex-valued sample data from the digital signals, and a matched filter for receiving the complex-valued sample data from the generating means and successively forming the receiving beams in different directions.

In a further aspect of the invention, a sonar system which emits an ultrasonic search pulse signal and receives echo signals by receiving beams formed successively and oriented in successively varying directions comprises a plurality of groups of transducer elements for receiving echo signals of a specific frequency f which is equal to 1/T where T is the period of the echo signals, a plurality of multiplexers which multiplex signals entered successively from each of the groups of the transducer elements into a smaller number of channels than the number of the transducer elements, wherein the multiplexers operate with synchronized switching timing, a plurality of A/D converters which convert analog signals entered respectively and individually from the multiplexers into digital form, wherein the A/D converters operate with synchronized sampling timing and repeatedly sample the analog signals from the each of the groups of the transducer elelments at a specific first sampling time instant, at a sampling time instant 1/4·T after the first sampling time instant, at a sampling time instant 1/2·T after the first sampling time instant and at a sampling time instant 3/4·T after the first sampling time instant to produce 0° sample data, 90° sample data, 180° sample data and 270° sample data respectively, outputting a value obtained by averaging the 0° sample data and the 180° sample data as in-phase data of complex-valued sample data and a value obtained by averaging the 90° sample data and 270° sample data as quadrature data of the complex-valued sample data, a phase shifter shifts the phases of individual sample data such that a specific phase relationship is established between the complex-valued sample data derived from the individual transducer elements, and a matched filter for receiving the complex-valued sample data from the phase shifter and successively forming the receiving beams in different directions.

In a still further aspect of the invention, a sonar system which emits an ultrasonic search pulse signal and receives echo signals by receiving beams formed successively and oriented in successively varying directions comprises a plurality of groups of transducer elements for receiving echo signals of a specific frequency, a plurality of multiplexers which multiplex signals entered successively from each of the groups of the transducer elements into a smaller number of channels than the number of the transducer elements, wherein the multiplexers operate with synchronized switching timing, a plurality of A/D converters which convert analog signals entered respectively and individually from the multiplexers into digital form, wherein the A/D converters operate with synchronized sampling timing, means for generating in-phase data of complex-valued sample data and quadrature data of complex-valued sample data from the digital signals, and a matched filter for receiving the inphase data of complex-valued sample data and quadrature data from the generating means and successively forming the receiving beams in different directions.

In a still further aspect of the invention, a sonar system which emits an ultrasonic search pulse signal and receives echo signals by receiving beams formed and oriented in varying directions comprises a plurality of transducer elements, a plurality of multiplexers which multiplex signals supplied from the transducer elements into a smaller number of channels having output terminals than the number of the transducer elements, wherein the multiplexers operate with synchronized switching timing, and a plurality of A/D converters respectively connected to the output terminals of the multiplexers which convert analog signals entered respectively and individually from the multiplexers into digital form, wherein the A/D converters operate with synchronized sampling timing.

In sonar systems like a bottom mapping sonar, the frequency of echo signals is almost same as the transmitting frequency because the Doppler effect is substantially negligible. Therefore, even if the echo signals are not sampled to obtain I- and Q-signals at the same time, it is possible to obtain in-phase data and quadrapture data by sampling the echo signals twice with a phase delay of 90°, or with a time delay of (a+1/4)T. According to this time-division method, it is possible to produce the in-phase data and quadrapture data without the provision of two channels for the in-phase data and quadrapture data.

The time interval between sampling of the in-phase data and sampling of the quadrapture data in one sampling cycle is made smaller than the time interval between sampling of the in-phase data in one sampling cycle and that in a succeeding sampling cycle. More specifically, the interval between in-phase data and quadrapture data sampling times in one sampling cycle is made smaller than half the recurrence time interval of successive sampling cycles as shown in FIG. 10A. As a consequence, it is possible to obtain complex-valued sample data with minimal errors even when the amplitude of an input echo signal varies as shown in FIG. 10B or its frequency deviates.

The smaller the time interval between sampling of in-phase data and sampling of quadrapture data, the better the results obtained. Optimum results are obtained when a=0, or when the time interval is T/4. Shown in FIG. 10B is an example in which the phase of the sample data is 45°. In this example, the sample value of in-phase data obtained at a sampling time to is 0.4861359 and the sample value of in-phase data obtained at a sampling time ti which is delayed by T/4 from to is 0.5155987. The phase obtained from these values is 43.32°, which contains an error equivalent to 0.0026 times the wavelength. Contrary to this, when the in-phase data and quadrapture data are sampled at equally-spaced time intervals (1.25T in the example of FIG. 10B), the sample value obtained at a sampling time t1 which is delayed by 1.25T from to is 0.6334498, and the phase obtained from this sample value and the sample value for obtained at the sampling time to is 37.50°, representing an error equivalent to 0.021 times the wavelength. It is understood from above that if the interval between in-phase data and quadrapture data sampling times in one sampling cycle is made smaller than half the recurrence time interval of successive sampling cycles, it is possible to obtain complex-valued sample data with minimal errors even when the amplitude or frequency of input signals varies or deviates.

It is also possible to cancel out a direct-current (DC) bias component superimposed on sample data by performing an averaging operation using sample data obtained at sampling times (n+1/2)T and (n+3/4)T.

When signals entered from a plurality of signal input means are multiplexed by using multiplexers, there can arise a case where noise produced by switching of the multiplexer in one channel adversely affects sample data in another channel if the multiplexers are switched one after another at regular time intervals. To avoid this problem, switching timing of all the multiplexers and sampling timing of all the A/D converters synchronized in this invention such that noise would not be induced into the sample data.

In a bottom mapping sonar, for example, signals entered from multiple channels are sequentially sampled at regular time intervals and resultant data which are arranged obliquely to a time axis are entered to a matched filter to thereby scan a sea bottom. Even when the input signals are sampled with synchronized timing as mentioned above, the phase of the sample data is shifted in such a way that a data string arranged obliquely to the time axis would be obtained. Alternatively, data sampled in a steplike form may be shifted such that data sampled at the same time would be obtained.

As stated above, data is sampled twice with a phase delay of (n+1/4)T to obtain in-phase data and quadrature data in this invention. Therefore, it is possible to produce complex-valued sample data without increasing the number of A/D converters or mixers.

According to the invention, even when DC bias components are superimposed on the sample data, it is possible to remove them by using 180° sample data and 270° sample data.

When the multiplexer of one channel is switched, it usually produces electrical noise which would adversely affect sample data of other channels. With this invention, however, data is not sampled in any channel when noise is generated, and the multiplexer is not switched in any channel during sampling process, because all the multiplexers are switched at the same time. This makes it possible to eliminates the influence of the noise. Furthermore, it is possible to achieve successive beamforming by use of a matched filter, for instance, by shifting sampling times arranged in a steplike form to a horizontal-line (simultaneous) sampling scheme or to an oblique-line sampling scheme.

DETAILED DESCRIPTION OF PREFERRED EMBODIMENTS OF THE INVENTION

Figure 1:
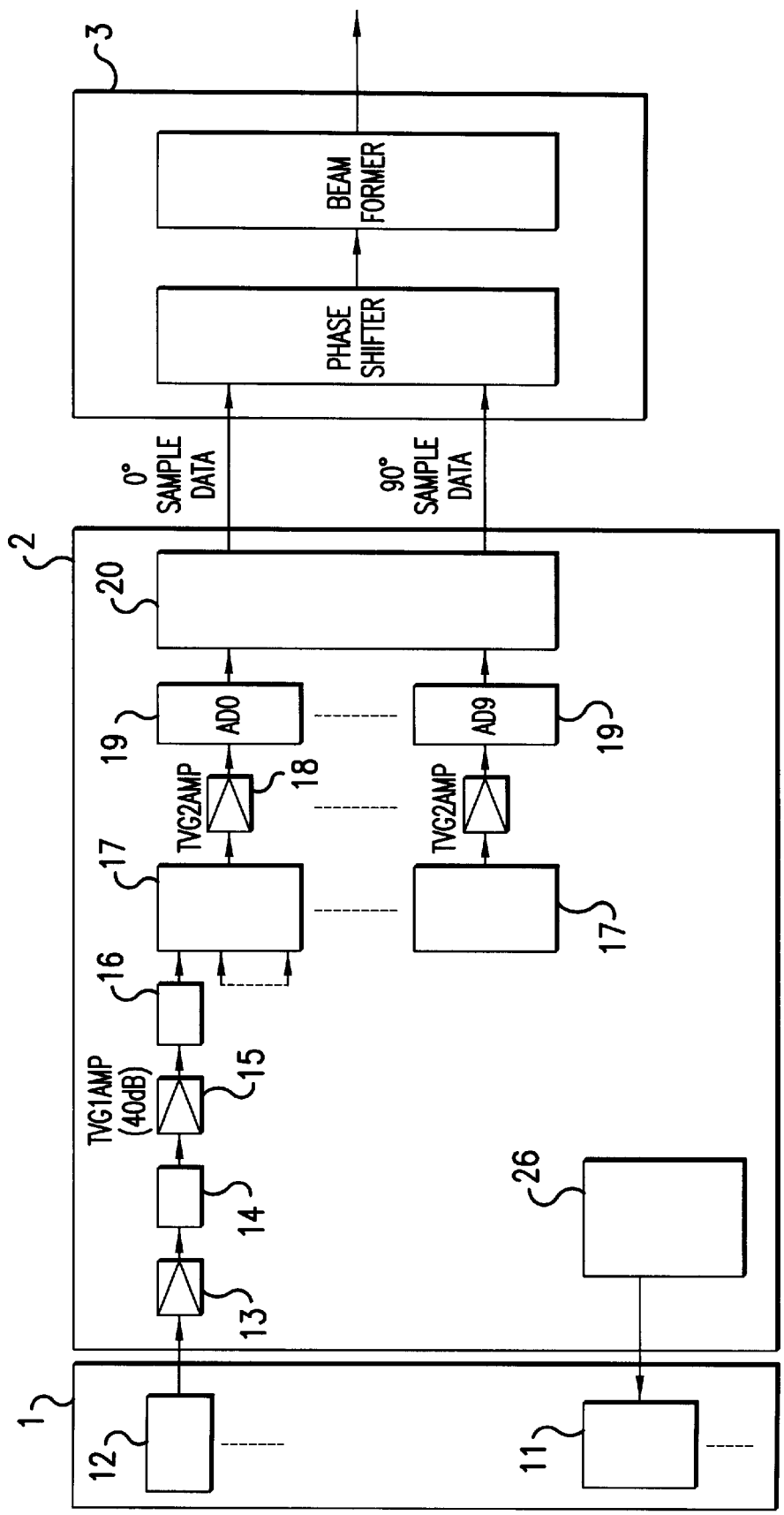
FIG. 1 is a block diagram of a bottom mapping sonar according to a preferred embodiment of the invention.
Figure 2A:
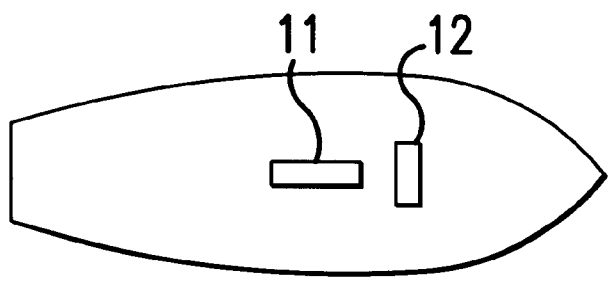
FIG. 2A is a diagram showing how a transmitting transducer unit and a receiving transducer unit of the bottom mapping sonar are installed.
Figure 2B:
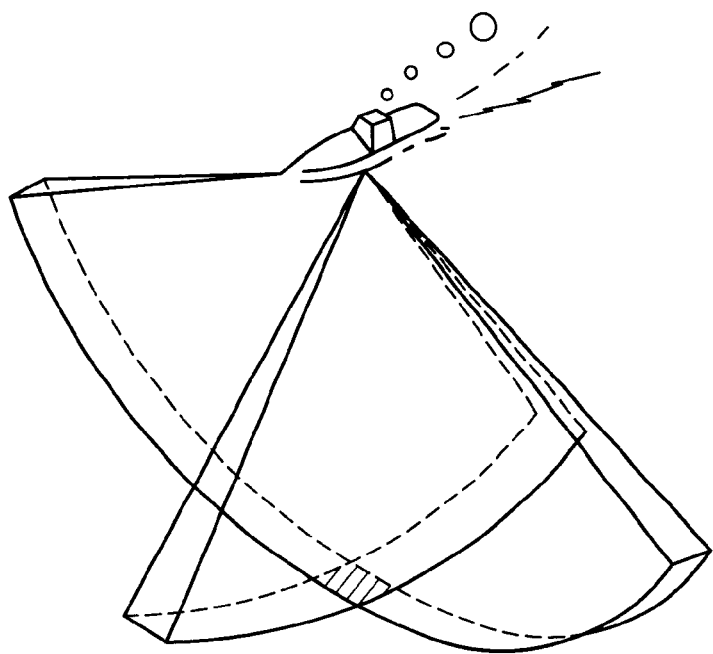
FIG. 2B is a diagram showing transmitting and receiving beams formed by the transducer units.

FIG. 1 is a block diagram of a bottom detecting sonar according to a preferred embodiment of the invention. FIG. 2A is a diagram showing how transmitting and receiving transducer units of the bottom detecting sonar are installed, and FIG. 2B is a diagram showing transmitting and receiving beams formed by the transducer units.

Referring to FIG. 2A, a transmitting transducer unit 11 and a receiving transducer unit 12 are comprised with ultrasonic transducer arrays, each array formed of a plurality of aligned transducer elements. The transmitting transducer unit 11 is installed on the bottom of a ship such that its array direction becomes parallel to the bow-stern direction, while the receiving transducer unit 12 is installed on the ship's bottom such that its array is oriented in the athwartship direction.

Besides a transducer section 1 which includes the transmitting transducer unit 11 and the receiving transducer unit 12, a transmitting and receiving unit 2 which applies burst signals to the transmitting transducer unit 11, receives echoes and converts them into digital sample data is mounted on the ship's bottom. A processor unit 3 of the sonar is installed in a ship's cabin. The processor unit 3 performs beamforming and bottom-detecting operations using the sample data supplied from the transmitting and receiving unit 2.

A transmission circuit 26 of the transmitting and receiving unit 2 applies electric pulse signals to the individual transducer elements of the transmitting transducer unit 11. Driven by these pulse signals, the transducer elements of the transmitting transducer unit 11 transmits ultrasonic signals into the water. The transmission circuit 26 comprises an oscillator which generates a 320 kHz signal, and applies the pulse signals to the individual transducer elements of the transmitting transducer unit 11 with controlled timing so that a downward-directed fan-shaped transmitting beam will be formed just under the ship's hull as illustrated in FIG. 2B. The transmitting beam thus formed has a fanlike shape approximately 1.5° thick in the ship's longitudinal direction and approximately 150° wide in the athwartship direction. The pulse signals entered to the individual elements have a frequency of 320 kHz and their pulselength is as long as about 10 to 50 times the wavelength. Since the transmitting beam thus formed is directed vertically downward, echo signals returning from the sea bottom are substantially unaffected by the Doppler effect and, thus, have almost the same frequency as that of the transmitted pulse signals (320 kHz) even when the ship is moving.

Figure 3:
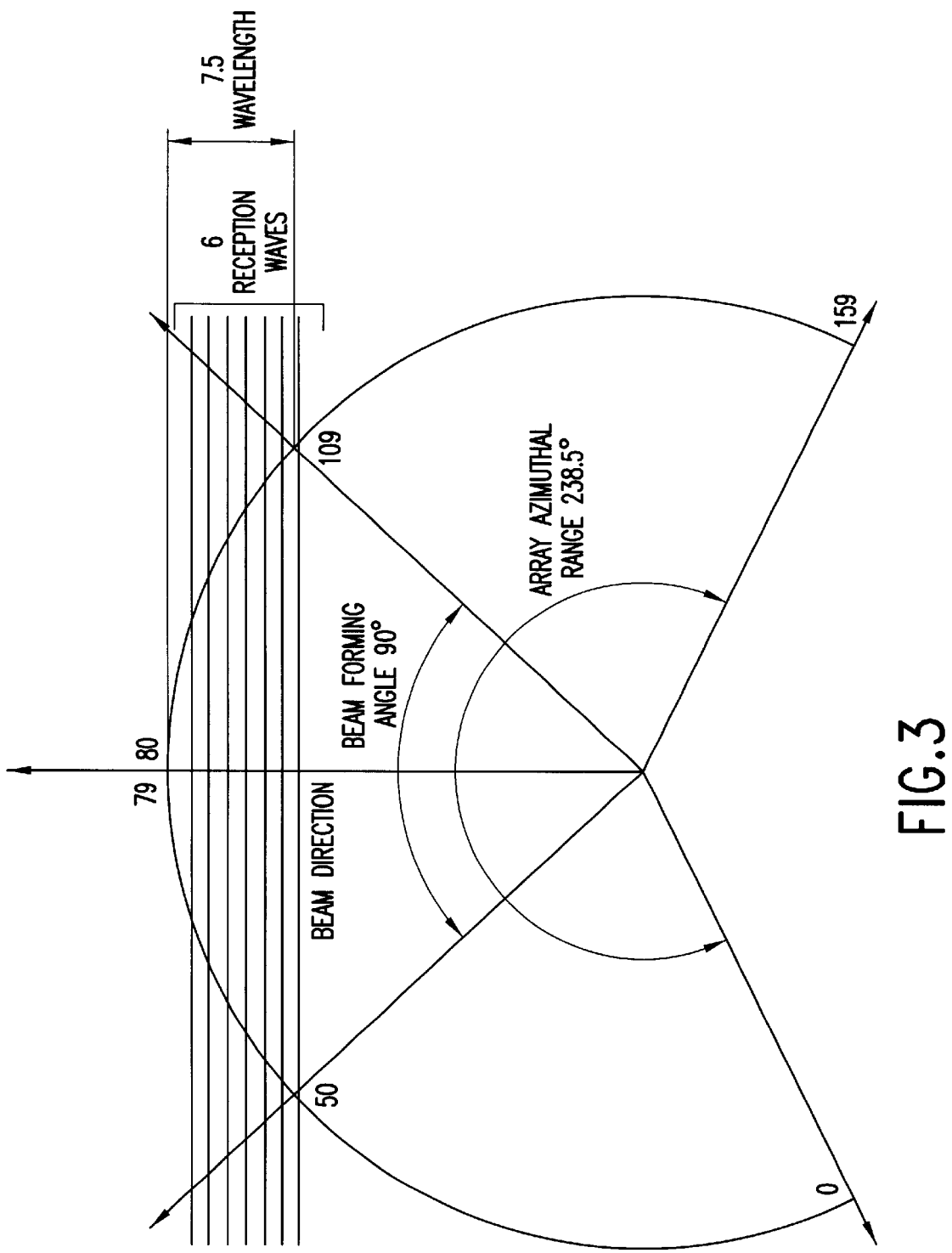
FIG. 3 is a diagram showing the configuration of the receiving transducer unit.

The receiving transducer unit 12 has a generally cylindrical shape with 160 transducer elements arranged on its circumference as shown in FIG. 3. The transmitting and receiving unit 2 and the processor unit 3 coupled to the receiving transducer unit 12 sample the return echoes received by the individual transducer elements and form the receiving beam having a fanlike shape approximately 20° wide in the ship's longitudinal direction and approximately 1.5° thick in the ship's athwartship direction as shown in FIG. 2B by comparing the received echoes with a reference by using a matched filter. To detect the sea bottom, this receiving beam is steered at a high speed from right to left a number of times while receiving return echoes resulting from each successive pulse transmission. Referring to FIG. 3, the generally cylindrical shape of the receiving transducer unit 12 has a radius of 125 mm, and a sectorial portion of this cylindrical shape is cut away, leaving a sectorial portion whose a central angle is 238.5°. The 160 receiving transducer elements are arranged at 1.5° intervals on this 238.5° sectorial portion.

The echo signals received by the individual transducer elements of the receiving transmitting and receiving unit 12 are supplied to the transmitting and receiving unit 2 through respective receiving channels. In the transceiver unit 2, the signals of the individual channels are separately amplified by preamplifiers 13, filtered by filters 14 and amplified by TVG (time-varied-gain) amplifiers 15. The filters 14 are bandpass filters which remove frequency components other than those falling within a specific frequency band around the transmission frequency (320 kHz) of the transmitting transducer unit 11. The return echoes are narrow-band ultrasonic signals of approximately 320 kHz as stated above. These bandpass filters 14 remove such unwanted noise components as noise generated by ultrasonic equipment and sea noise which do not fall within the pass band of the bandpass filters 14.

The TVG amplifiers 15 are of a type whose gain is increased with the lapse of time after the transmitting transducer unit 11 has transmitted a burst of ultrasonic waves. The reason why their gain is increased with time is that the more the time elapses after transmission of the ultrasonic waves, the further away the ultrasonic waves are reflected from. This means that it is necessary to receive return echoes of progressively decreased signal levels with the lapse of time due to an increase in the distance traveled by the ultrasonic waves. The gain of the TVG amplifiers 15 is progressively increased with time to make up for the progressively weakening return echoes. To remove noise produced by the TVG amplifiers 15, simple filters 16 are inserted in a succeeding stage of the individual TVG amplifiers 15. The echo signals which have been passed through these filters 16 are entered to multiplexers 17 which performs a multiplexing operation using a time-division technique to combine 160 channels into 10 channels. Specifically, the echo signals of upstream channels numbered 10n+k are entered to the multiplexers 17 of downstream channels numbered k, where k is an integer from 0 to 9 and n is an integer from 0 to 15. More specifically, the signals of the upstream channels 0, 10, 20, . . . , 140, 150 are entered to a multiplexer No. 0, the signals of the upstream channels 1, 11, 21, . . . , 141, 151 are entered to a multiplexer No. 1, . . . , and the signals of the upstream channels 9, 19, 29, . . . , 149, 159 are entered to a multiplexer No. 9. Operating in synchronism with one another, the multiplexers Nos. 0 through 9 sequentially switch their input signals by incrementing the integer variable n. It is to be noted that channels formed at forward stages with respect to the multiplexers are called upstream channels. Each upstream channel comprises, for example, a transducer element and filter 14. The channels formed at backward stages with respect to the upstream channels are called downstream channels.

The return echo signals multiplexed and combined to 10 channels are individually amplified again by second TVG amplifiers 18. While typical TVG amplifiers have a controllable gain range of about 40 dB, a TVG range of 40 dB or more is needed to scan a wide area of sea bottom. This is why the present embodiment employs a two-stage TVG amplifier configuration. Although it might be possible to obtain desired transient response characteristics by inserting two TVG amplifiers in a succeeding stage of each multiplexer, the multiplexers and their succeeding stages must have wideband capability and, therefore, noise generated by the TVG amplifier of the first stage could pose a problem. For this reason, the first TVG amplifiers 15 are provided in a preceding stage of each multiplexer 17 and connected to each multiplexer 17 via the simple filters 16 which limit amplification noise.

The signals amplified by the individual TVG amplifiers 18 are sampled and converted into digital sample data by A/D converters 19 (AD0 through AD10). Sampling timing of the A/D converters 19 and switching timing of the multiplexers 17 are controlled based on the aforementioned signal generated by the oscillator of the transmission circuit 26. Specifically, both the sampling timing of the A/D converters 19 and the switching timing of the multiplexers 17 are synchronized with the frequency of the transmitted pulse signals (return echo signals).

Figure 4:
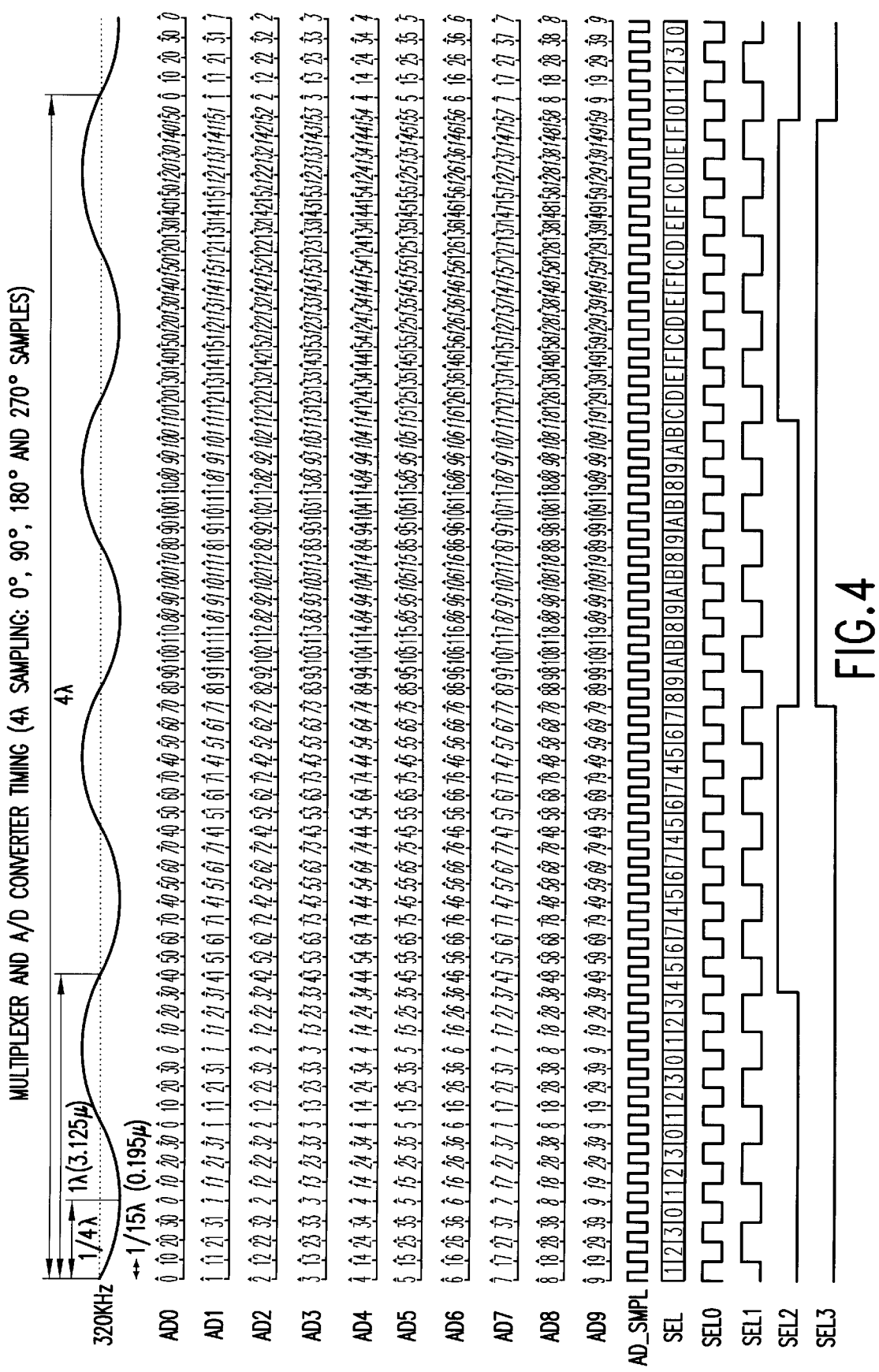
FIG. 4 is a sampling timing chart illustrating the operation of A/D converters.

FIG. 4 is a diagram depicting the sampling timing of the A/D converters 19.

For the processor unit 3 in a succeeding stage to process the return echo signals in the form of complex-valued data, it is desirable that the return echo signals be converted into complex-valued data in sampling process. However, a process of mixing a real-valued signal with a cosine signal and a sine signal to separate it into in-phase portion I and quadrature portion Q signals and sampling them separately would complicate circuit configuration and cause measurement errors due to phase shifts, for example.

Considering that the frequency of the received echo signals is stable and a sampling clock is completely synchronized with this frequency, complex-valued sample data are generated by sampling the echo signals twice with a phase delay of 90° and then using one part of the data as an in-phase portion and the other one part of the data as a quadrature portion in this sonar system. Furthermore, the sonar system samples the echo signals four times with a phase delay of 90° (0°, 90°, 180°, 270°)and removes a DC bias, or offset, component of the echo signals by combining 0° sample data with 180° sample data, and 90° sample data with 270° sample data.

Since the echo signals of the 160 upstream channels are multiplexed into the 10 downstream channels using the time-division technique as stated above, each of the 10 downstream channels handles the echo signals of the 16 upstream channels. Each of the 10 downstream channels samples the signals of 4 upstream channels during one complete cycle, or the period, (1λ) of the 320 kHz return echo signals. In other words, each channel samples the signals of 16 upstream channels during four times the period (4λ) of the 320 kHz return echo signals.

The sampling timing is explained in further detail with reference to FIG. 4. The signals of the upstream channels numbered 10*n*+0 (where n=0, 1, . . . , 15) are selectively fed to the A/D converter AD0 via the corresponding multiplexer 17. Also, the signals of the upstream channels numbered 10*n*+1 are selectively supplied to the A/D converter AD1 via the corresponding multiplexer 17. Similarly, the signals of the upstream channels numbered 10*n* +k (where k=0, 1, . . . , 9) are selectively entered to each A/D converter ADk. The individual A/D converters AD0 through AD9 sample the input signals at regular time intervals of 1/16λ (0.195625 μs). Therefore, 16 cycles of sampling operation are performed during the period 1λ.

Each A/D converter ADk samples the signals of the upstream channels numbered k, 10+k, 20+k and 30+k by switching these channels one after another during a first cycle of 1λ. Since the A/D converter ADk of each channel samples the input signals four times during the period 1λ at intervals of 1/4λ (=1/16λ×4), four data are obtained with relative phase delays of 0°, 90°, 180° and 270°.

In a second cycle of the period 1λ, the A/D converter ADk of each channel samples the input signals of the upstream channels numbered 40+k, 50+k, 60+k and 70+k by switching these channels one after another. Further, in a succeeding cycle of the period 1λ, the A/D converter ADk of each channel samples the input signals of the upstream channels numbered 80+k, 90+k, 100+k and 110+k by switching these channels one after another. Again in a succeeding cycle of the period 1λ, the A/D converter ADk of each channel samples the input signals of the upstream channels numbered 120+k, 130+k, 140+k and 150+k by switching these channels one after another. As the individual A/D converters ADk sample the input signals in this manner, it is possible to obtain four data with relative phase delays of 0°, 90°, 180° and 270° for each of the 160 upstream channels during a 4λ cycle time.

In the sonar system of this embodiment, the sampling operation of all the A/D converters ADk is completely synchronized and the multiplexers 17 are switched at the same time in synchronism with one another even after the sampling operation. As long as the A/D converters ADk are of a type whose operating frequency is about 20 MHz, only the input signals entered immediately before sampling affect sample data obtained, and even if the multiplexers 17 are switched immediately after the sampling process, switching noise does not cause any adverse effects on sample data which will be obtained in a succeeding sampling process.

As the multiplexers 17 are switched and the TVG amplifiers 18 of their succeeding stage operate immediately after the sampling of the input signals, noise caused by select signals of the multiplexers 17 and by changes in output data of the A/D converters 19 is sufficiently decreased before the succeeding sampling operation (0.195625 μs later) and, therefore, the noise does not cause any adverse effects on the succeeding sampling operation as stated above. In addition, because switching of the multiplexers 17 and the A/D converters 19 of the 10 channels is synchronized as stated earlier, switching noise which may occur in one channel does not enter and adversely affect another channel.

The sample data thus produced by the A/D converters 19 are entered to an averaging circuit 20. The averaging circuit 20 averages two pairs of the sample data, that is, the 0° sample data and the 180° sample data, and the 90° sample data and the 270° sample data, for each channel. Since the timing of these sample data is set to synchronize with the same clock as the transmitting frequency (the frequency of the return echoes), the 0° sample data and the 180° sample data should have almost the same amplitude levels but values of opposite polarities and, likewise, the 90° sample data and the 270° sample data should have almost the same amplitude levels but values of opposite polarities. It is therefore possible to calculate 0° sample data (in-phase data R) excluding a DC offset component by performing an averaging operation expressed by (0° sample data−180° sample data)/2. The DC offset component is produced due to an alternating current (ac) coupling with asymmetrical positive and negative characteristics or an offset error of the A/D converters 19. It is also possible to calculate 90° sample data (quadrature data I) excluding a DC offset component by performing an averaging operation expressed by (90° sample data−270° sample data)/2. The averaging circuit 20 outputs the 0° sample data and the 90° sample data as the complex-valued sample data.

These complex-valued sample data are transmitted to the processor unit 3 in the ship's cabin via a high-speed link made of an optical fiber, for example. Since the A/D converters 19 of the transmitting and receiving unit 2 and their succeeding stages perform digital processing, it is not necessary that sample data transmission timing be exactly synchronized with timing shown by a steplike broken line "a" in FIG. 5. The sample data should just be sent from the transmitting and receiving unit 2 to the processor unit 3 in such a manner that succeeding processing operations can be executed on a real-time basis. Although the data of channels 0 through 9 are of the same timing, transmission of these data from the transmitting and receiving unit 2 to the processor unit 3 is made in serial form and they are processed as the data of the same timing in the processor unit 3.

While the receiving transducer unit 12 has a generally cylindrical shape having a central angle is 238.5° on which the 160 receiving transducer elements are arranged at 1.5° intervals as shown in FIG. 3, the receiving beam is formed by using 60 transducer elements contained in an approximately 90° sector centered on the direction of the receiving beam at any given instant. The individual transducer elements are hereinafter identified by channel numbers assigned to them. When the receiving beam is formed by using the transducer elements of channels 0 through 59, the receiving beam is pointed in a direction just between channels 29 and 30 as viewed from the center of the receiving transducer unit 12. Assuming that this direction is 0°, the transducer element of channel 0 is located in a 44.5° direction and the transducer element of channel 59 is located in a −44.5° direction.

Figure 5:
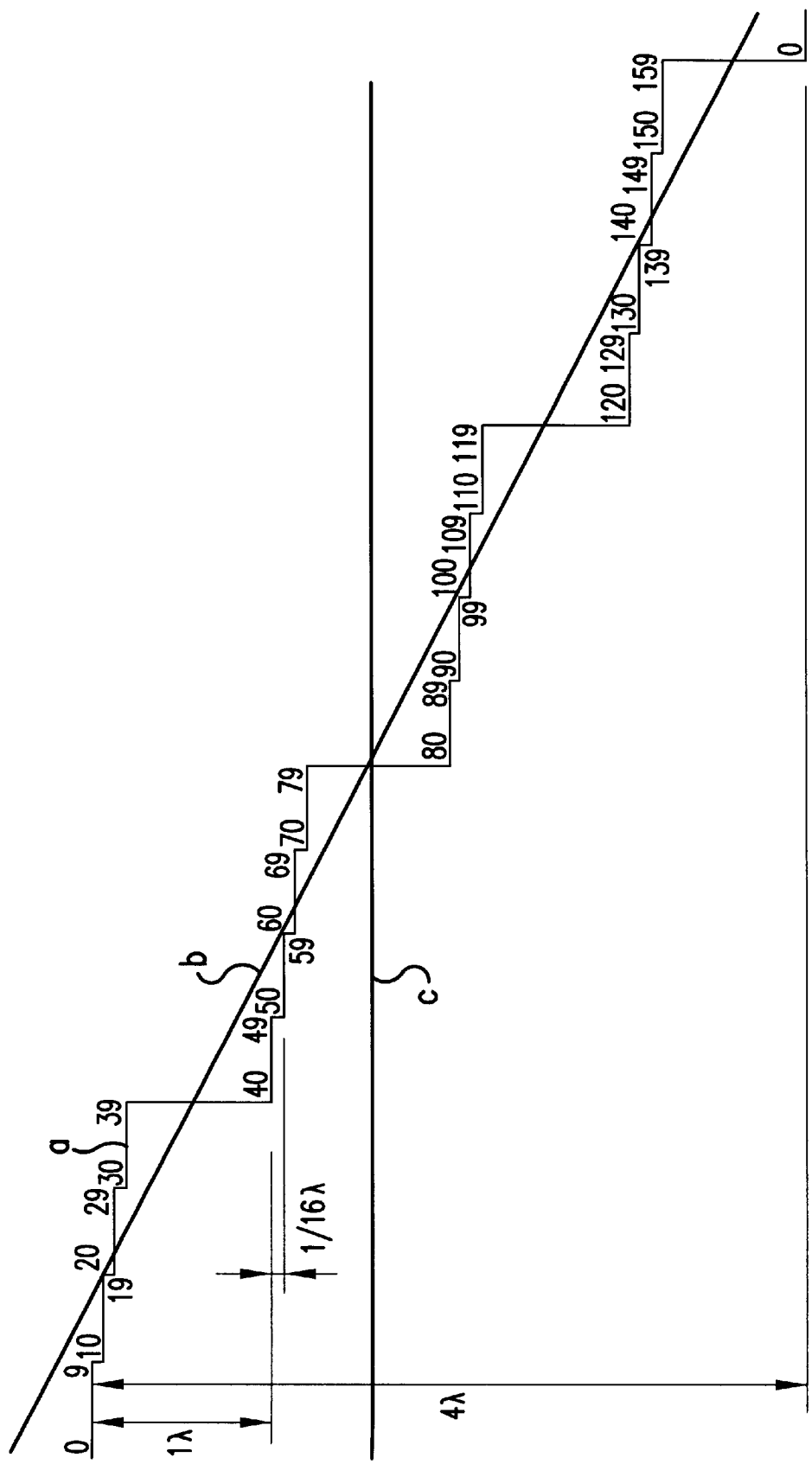
FIG. 5 is a diagram depicting a phase-shifting method used in a processor unit of the bottom detecting sonar.
Figure 6:
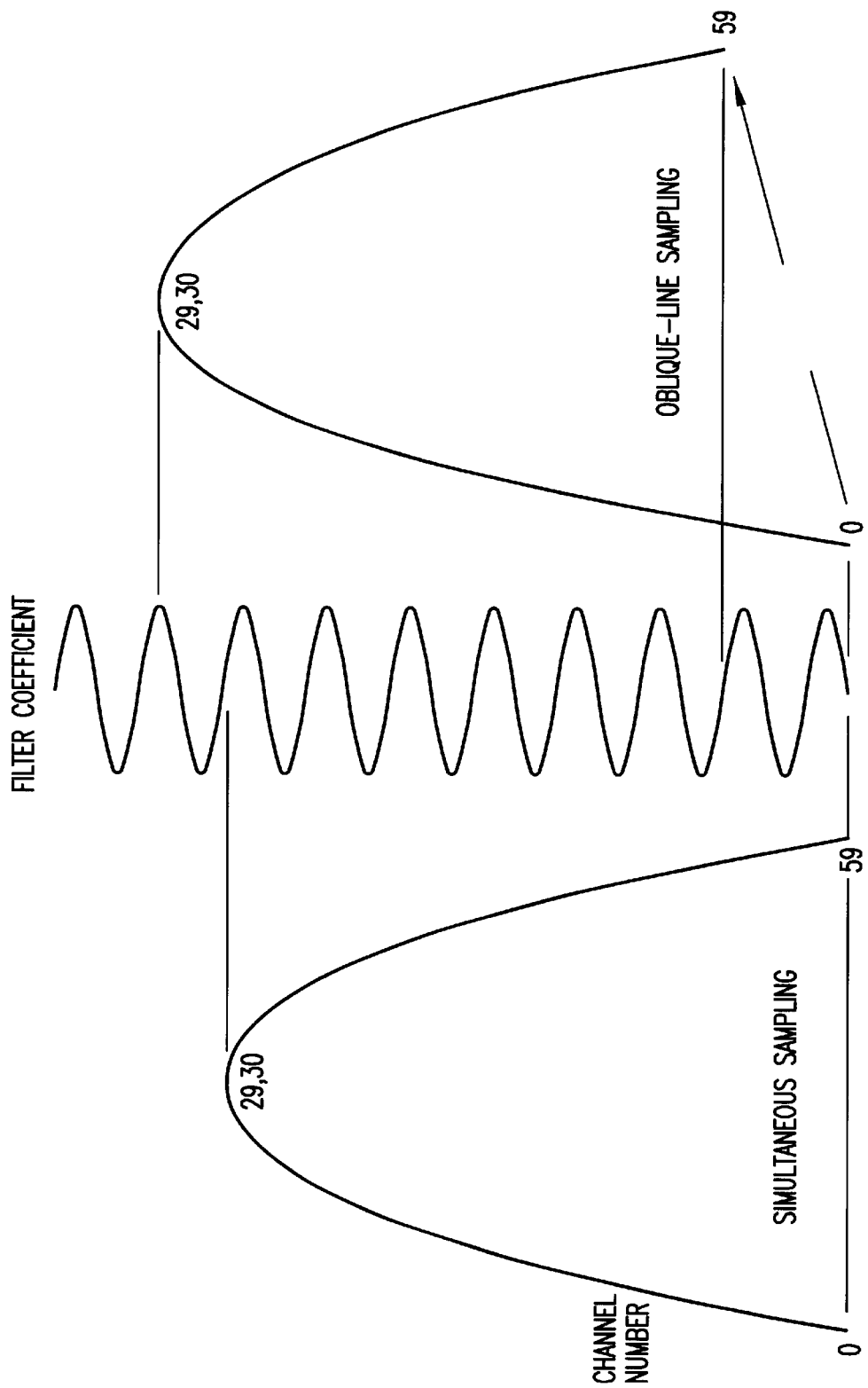
FIG. 6 is a diagram depicting a beamforming method used in the processor unit.

FIGS. 5 and 6 are diagrams showing principles of phase-shifting and receiving beam forming operations performed by the processor unit 3. The sample data entered from the transmitting and receiving unit 2 to the processor unit 3 are those obtained at sampling times shown by the broken line "a" in FIG. 5. As previously mentioned, each of the echo signals is sampled four times at 0°, 90°, 180° and 270°. The 180° sample data and the 270° sample data are used for removing the DC offset component and the 90° sample data is used as the quadrature data I. Therefore, the complex-valued sample data at the timing of the 0° sample data is entered to the processor unit 3.

The processor unit 3 forms a receiving beam using 60 adjacent channels and steers the receiving beam from right to left. In other words, the processor unit 3 successively forms 101 receiving beams, including receiving beam 0 formed by the transducer elements of channels 0 through 59 to receiving beam 100 formed by the transducer elements of channels 100 through 159. Since this successive beamforming operation is performed by using the earlier-mentioned matched filter, it is necessary that the data of channels 0 through 159 have time-sequential continuity. For this reason, the data of the individual channels are shifted in phase in such a way that they can be treated as data whose timing is represented by an oblique line "b" or a horizontal line "c" of FIG. 5. The oblique line b is a line representing a phase relationship in which sampling times of the individual sample data are spaced at fixed intervals and the continuity from the data of channel 159 to the succeeding data of channel 0 is ensured. On the other hand, the horizontal line c is a line representing a phase relationship in which sampling times of the individual data derived from channels 0 through 159 are shifted as if all the data are sampled at the same sampling time. The phase-shifting operation is performed by advancing or retarding the phase of each sample data so that its phase matches the phase represented by the oblique line b. The sampling timing to which the individual sample data are to be shifted, or the position of the oblique line b or the horizontal line c, may be selected arbitrarily.

In the case of oblique-line sampling, there are sampled the data exactly at the sampling times shown by the oblique line b. If, however, switching timing of the transducer element or the A/D converter 19 of any channel deviates, it could adversely affect another channel by inducing noise, for instance, as stated earlier. The switching timing is therefore synchronized as shown by the steplike broken line "a" in FIG. 5.

The individual sample data derived from channels 0 through 159 which have been shifted in phase are sequentially compared with the earlier-mentioned reference. FIG. 6 shows an example of the reference. The reference represents received echo levels of the individual channels obtained when the return echoes, which are parallel beams of sound waves, first arrive upon the receiving transducer elements of the channel oriented to the direction of the incoming echoes and then arrive upon the receiving transducer elements of the outer channels along the cylindrical surface of the receiving transducer unit 12 in sequence. When multiple sets of sample data obtained by the receiving beam 0 formed by the transducer elements of channels 0 through 59 up to the receiving beam 100 formed by the transducer elements of channels 100 through 159 are sequentially compared with the reference, a high correlation is obtained with the receiving beam oriented to the direction from which the return echoes actually arrive. The direction of the incoming return echoes can be determined by this correlation process.

Since the receiving transducer unit 12 has the radius of 125 mm as previously stated, the transducer elements of channels 29 and 30 oriented in directions closest to the direction of the receiving beam 0 are separated from the outermost transducer elements of channels 0 and 59 by a distance equivalent to about 7.5 times the wavelength. Specifically, this distance is calculated as follows:

$$125 \times (1 - \sqrt{2})/(15000/320) \sim 7.5$$

To improve the accuracy of bottom sounding, on the other hand, there is a tendency to use ultrasound bursts of shorter pulselengths in bottom mapping sonars and general sonar systems. If the bottom detecting sonar of the present embodiment is designed in this fashion, the return echoes also have a short pulselength. If the pulselength of the return echoes arriving from the beam direction is smaller than 7.5 times the wavelength, the return echoes produced by a single transmission are not received at the same time by the transducer elements of 60 channels simultaneously used to form the receiving beam. To overcome this problem, the return echoes are sampled at time intervals of four times the wavelength, and the receiving beam is formed by dividing the transducer elements of 60 channels into two groups such that the distance covered by 7.5 times the wavelength is divided into two parts.

More specifically, the transducer elements of channels 0 to 59 which form the receiving beam 0 are divided into two groups, that is, group 1 including outer channels 0 to 9 and channels 53 to 59, and group 2 including central channels 10 to 52. The channels of group 1 use the data sampled from the return echoes derived from a current transmission cycle while the channels of group 2 use the data sampled from the return echoes derived from a preceding transmission cycle in performing the beamforming operation (correlation with the reference). As a consequence, there will be utilized the sample data derived from the return echoes of all the channels used in forming the receiving beam and thereby improve the accuracy of bottom sounding.

Groups 1 and 2 mentioned above are related to grouping of the channels applicable to a case where the sample data are shifted in phase according to the aforementioned oblique-line sampling scheme. In a case where the sample data are shifted as if all the data are sampled at the same sampling time, group 1 includes channels 0 to 8 and channels 51 to 59, and group 2 includes channels 9 to 50.

Figure 11:
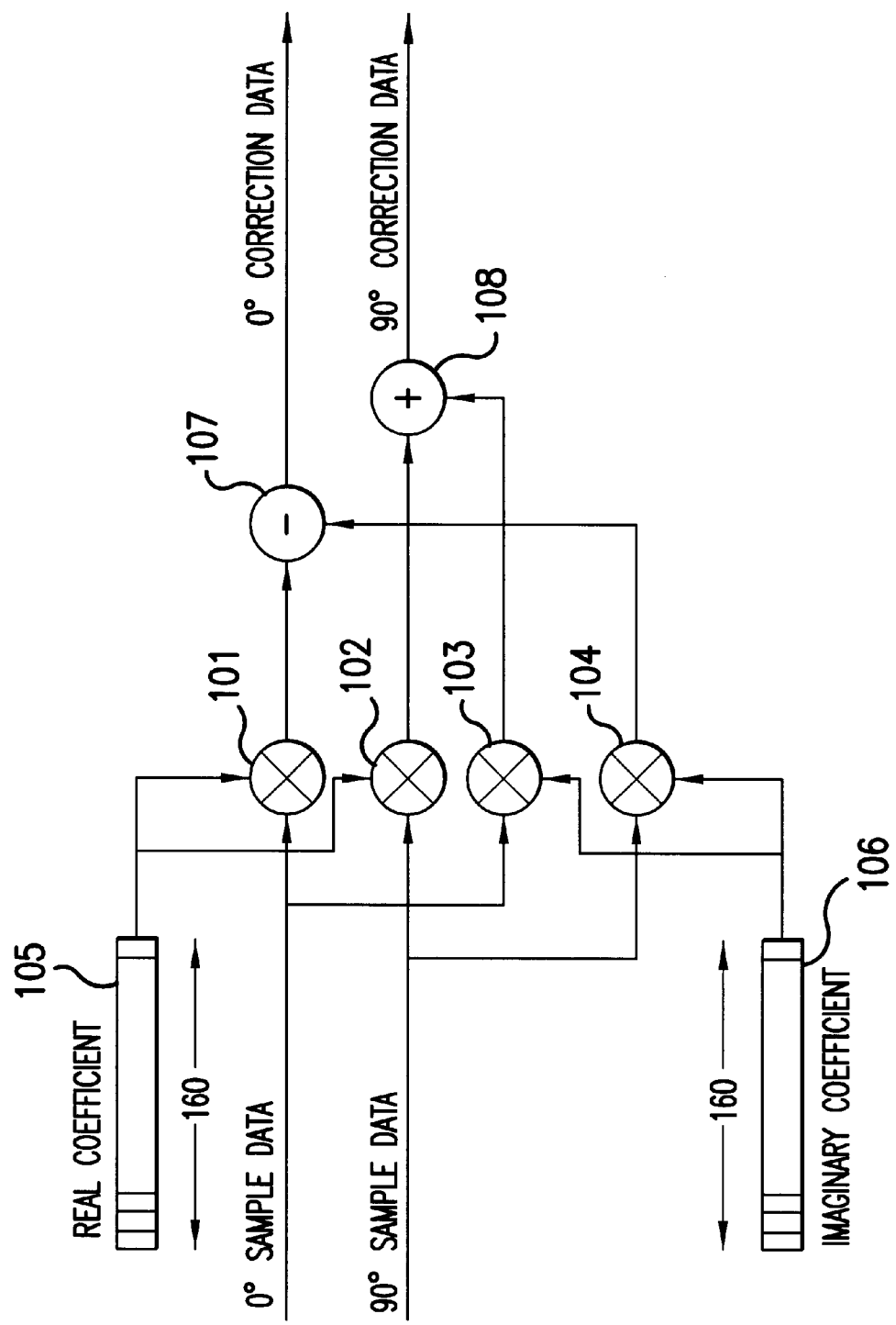
FIG. 11 is a block diagram of a phase shifter incorporated in the processor.

Referring to FIG. 11, the phase shifter incorporated in the processor unit 3 comprises four multipliers 101, 102, 103 and 104, two RAMs 105 and 106, a subtracter 107 and an adder 108. The RAM 105 stores real part coefficients for the corresponding 160 transducer elements, while the RAM 106 stores imaginary part coefficients for the corresponding 160 transducer elements. The multiplier 101 multiplies 0° sample data supplied from the averaging circuit 20 by corresponding real part coefficients outputted from the RAM 105 respectively. The multiplier 102 multiplies 90° sample data supplied from the averaging circuit 20 by corresponding real part coefficients outputted from the RAM 105 respectively. The multiplier 103 multiplies 0° sample data supplied from the averaging circuit 20 by corresponding imaginary part coefficients outputted from the RAM 106 respectively. The multiplier 104 multiplies 90° sample data supplied from the averaging circuit 20 by corresponding imaginary part coefficients outputted from the RAM 106 respectively. The subtracter 107 performs subtraction operations on the output signals of the multiplier 101 and the output signals of the multiplier 104 to produce 0° correction data to the beamformer. The adder 108 performs addition operations on the output signals of the multiplier 102 and the output signals of the multiplier 103 to produce 90° correction data to the beamformer.

The phase shifter shown in FIG. 11 operates in accordance with the equation (1) which will be presented in the following.

Figure 7:
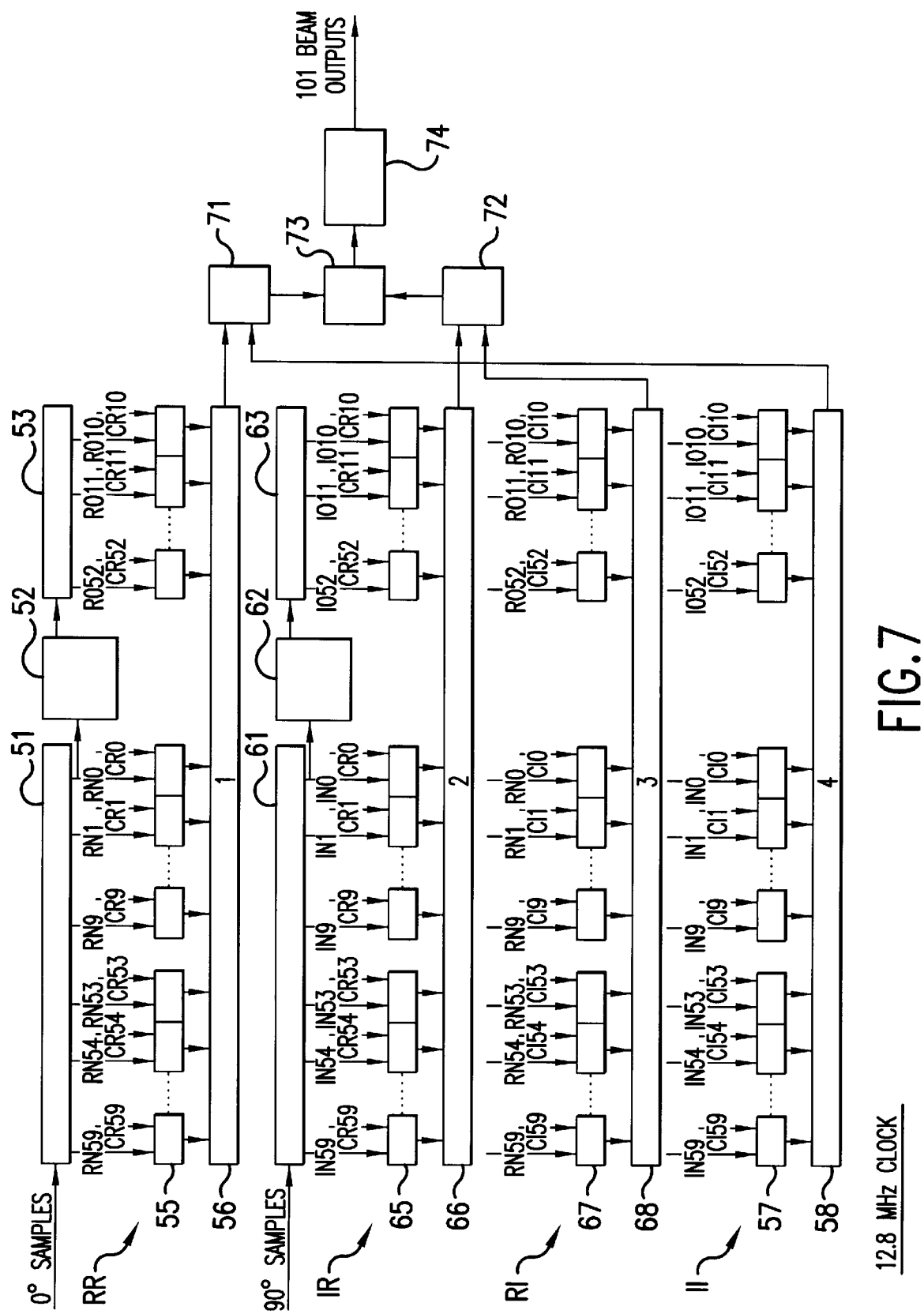
FIG. 7 is a diagram showing the configuration of a beamformer incorporated in the processor unit.

FIG. 7 is a diagram showing the configuration of a beamformer incorporated in the processor unit 3. The beamformer is constructed of a complex matched filter. In actual systems, the beamforming operation is made in the form of mathematical operation carried out by the complex matched filter.

Specifically, the 0° sample data which are the in-phase data R of the complex-valued sample data are entered to a 60-stage shift register 51, a 107-stage shift register 52 and 43-stage shift register 53 in this order. Also, the 90° sample data are entered to a 60-stage shift register 61, a 107-stage shift register 62 and 43-stage shift register 63 in this order.

In FIG. 7, designated by $R_N$ and $R_O$ are the 0° sample data (in-phase data), of which $R_N$ indicates data entered by sampling during current $4\lambda$ cycles and $R_O$ indicates data entered by sampling during preceding $4\lambda$ cycles. Also, designated by $I_N$ and $I_O$ are the 90° sample data (quadrature data), of which $I_N$ indicates data entered by sampling during the current $4\lambda$ cycles and $I_O$ indicates data entered by sampling during the preceding $4\lambda$ cycles. Further, designated by $C_R$ and $C_I$ are reference coefficients of the complex matched filter, of which $C_R$ indicates an in-phase coefficient of the reference and $C_I$ indicates a quadrature coefficient of the reference. Numbers suffixed to the aforementioned symbols indicate element (channel) numbers. The reference coefficients $C_R$ and $C_I$ suffixed with numbers 0 to 59 have fixed values. In contrast, although the input sample data $R_N$, $R_O$, $I_N$ and $I_O$ are suffixed with channel numbers 0 to 59 in FIG. 7, the channel numbers are successively shifted (incremented) and the sample data of the corresponding channels are entered.

The matched filter is constructed of four filter lines RR, IR, RI, II as shown in FIG. 7. Designated by RR is a filter which calculates the degree of correlation between $R_N$, $R_O$ (in-phase data) and $C_R$ (in-phase coefficient). This filter RR includes 60 multipliers 55 which multiply the reference coefficient $C_R$ by the 0° sample data with corresponding timing (beam direction) and an adder 56 which adds up the results of multiplications. Also, designated by II is a filter which calculates the degree of correlation between $I_N$, $I_O$ (quadrature data) and $C_I$ (quadrature coefficient). This filter II includes 60 multipliers 57 which multiply the reference coefficient $C_I$ by the 90° sample data with corresponding timing (beam direction) and an adder 58 which adds up the results of multiplications. The result of addition by the adder 56, or a filter output (RR) of the filter line RR, and a filter output (II) of the filter line II are entered to a subtracter 71, which performs a subtraction (RR)−(II) and calculates a value representing the degree of correlation between phases of the in-phase portion of the complex-valued sample data and the in-phase portion of a complex-valued reference coefficient. Specifically, this correlation value expressing the correlation between the complex-valued sample data and the complex-valued reference coefficient is calculated as follows:

$$C_1 \cdot C_2 = M_{1e}{}^{j\Theta1} \cdot M_{2e}{}^{j\Theta2} = M_1 \cdot M_{2e}{}^{j(\Theta1+\Theta2)}; |C_2|=1 \; C_1 \cdot C_2 = (R+jI) \; (C_R+jC_I) = (R \cdot C_R - I \cdot C_I) + j(I \cdot C_R + R \cdot C_I) \quad (1)$$

On the other hand, designated by IR is a filter which calculates the degree of correlation between $I_N$, $I_O$ (quadrature data) and $C_R$ (in-phase coefficient). This filter IR includes 60 multipliers 65 which multiply the reference coefficient $C_R$ by the 90° sample data with corresponding timing (beam direction) and an adder 66 which adds up the results of multiplications. Also, designated by RI is a filter which calculates the degree of correlation between $R_N$, $R_O$ (in-phase data) and $C_I$ (quadrature coefficient). This filter RI includes 60 multipliers 67 which multiply the reference coefficient $C_I$ by the 0° sample data with corresponding timing (beam direction) and an adder 68 which adds up the results of multiplications. The result of addition by the adder 66, or a filter output (IR) of the filter line IR, and a filter output (RI) of the filter line RI are entered to an adder 72, which performs an addition (IR)+(RI) and calculates a value representing the degree of correlation between phases of the in-phase portion of the complex-valued sample data and the in-phase portion of a complex-valued reference coefficient. Specifically, this correlation value is calculated by equation (1) above.

Calculation results of the subtracter 71 and the adder 72 are entered to an amplitude detector 73. The amplitude detector 73 calculates the amplitude of the receiving beam based on the calculation results entered. The amplitude can be calculated by $$\sqrt{R^2+I^2} \quad (2)$$

If it is desired to perform this calculation by using a hardware device, a table or a circuit having an approximation capability may be used. An output circuit 74 is a circuit which is required because the elements are not provided all around the receiving transducer unit 12. The output circuit 74 takes out 101 beams at clocks 59 to 159 of the shift registers. These 101 beams are the earlier-mentioned 101 receiving beams from the receiving beam 0 oriented in the direction just between channels 29 and 30 up to the receiving beam 100 oriented in the direction just between channels 129 and 130. This operation is repeatedly performed at intervals equal to four times the period ($4\lambda$) of the 320 kHz received pulse signals.

Figure 12:
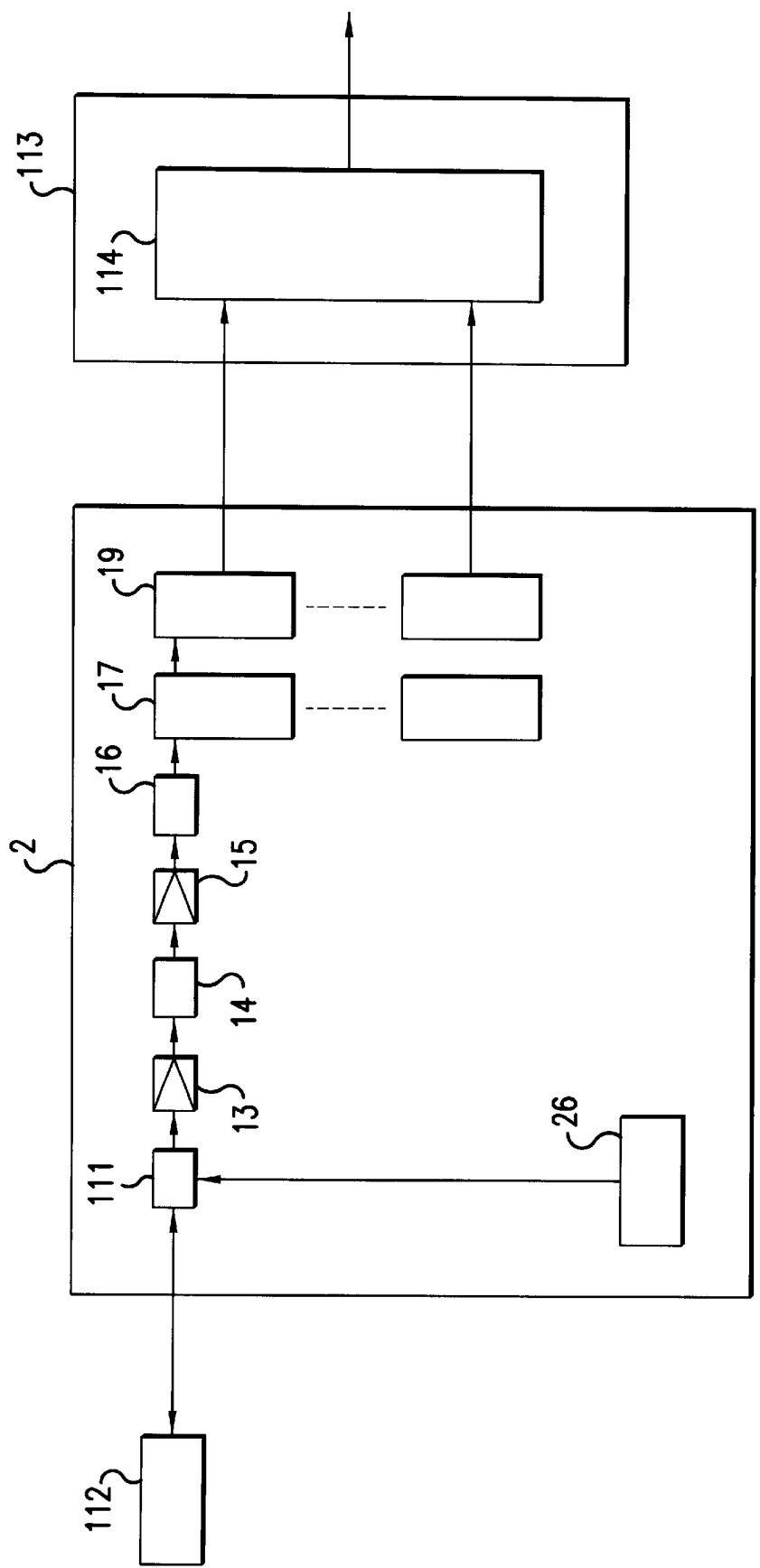
FIG. 12 is a block diagram of a scanning sonar according to a preferred embodiment of the invention.

Referring to FIG. 12, another embodiment according to the invention will be explained hereinafter. The invention is embodied a general type of scanning sonar. Like numerals are assigned to the same units shown in FIG. 1.

The transmission circuit 26 supplies a search pulse signal having a carrier frequency of, for example, 200 KHz through a T/R switch 111 to a transducer unit 112. The transducer unit 112 comprises 160 transducer elements placed at equal intervals on an imaginary circle. Echo signals received by the transducer elements advance through the T/R switch 111, preamplifier 13, filter 14, TVG amplifier 15 and filter 16 to ten corresponding multiplexers 17. The multiplexers 17 multiplex the input signals to ten channels to supply the output signals to the ten A/D converters AD0 through AD9 respectively. The output signals of the ten A/D converters AD0 through AD9 are supplied to the processor unit 113 comprising a beam former 114.

The ten multiplexers and A/D converters AD0 through AD9 multiplex and sample the input signals in the same way, for example, as shown in FIG. 4. The beamformer 114 shifts in phase the input signals by desired amounts and forms receiving beams in accordance with the equation (1). The beamformer 114 performs phase-shifting and beam-forming operations at the same time.

Although the data of the 160 channels are multiplexed and sampled as shown in FIG. 4, it is also possible to employ another method of multiplexing and sampling the signals. With the arrangement of the 160 transducer elements, ten multiplexers and ten A/D converters being the same as the foregoing embodiment, the A/D converter ADO, for example, samples the data from the transducer elements 0 through 15 in an order of 0, 1, 2, 3, 0, 1, 2, 3, 0, 1, 2, 3, 0, 1, 2, 3, 4, 5, 6, 7, 4, 5, 6, 7, . . . 12, 13, 14, 15, 12, 13, 14, 15, 12, 13, 14, 15 and 12, 13, 14, 15. The A/D converter AD1 samples the data from the transducer elements 16 through 31 in an order of 16, 17, 18, 19, 16, 17, 18, 19, 16, 17, 18, 19, 16, 17, 18, 19, . . . 28, 29, 30, 31, 28, 29, 30, 31, 28, 29, 30, 31, and 28, 29, 30, 31. Likewise, the other A/D converter AD2 through AD9 sample data from corresponding transducer elements respectively.

Figure 8:
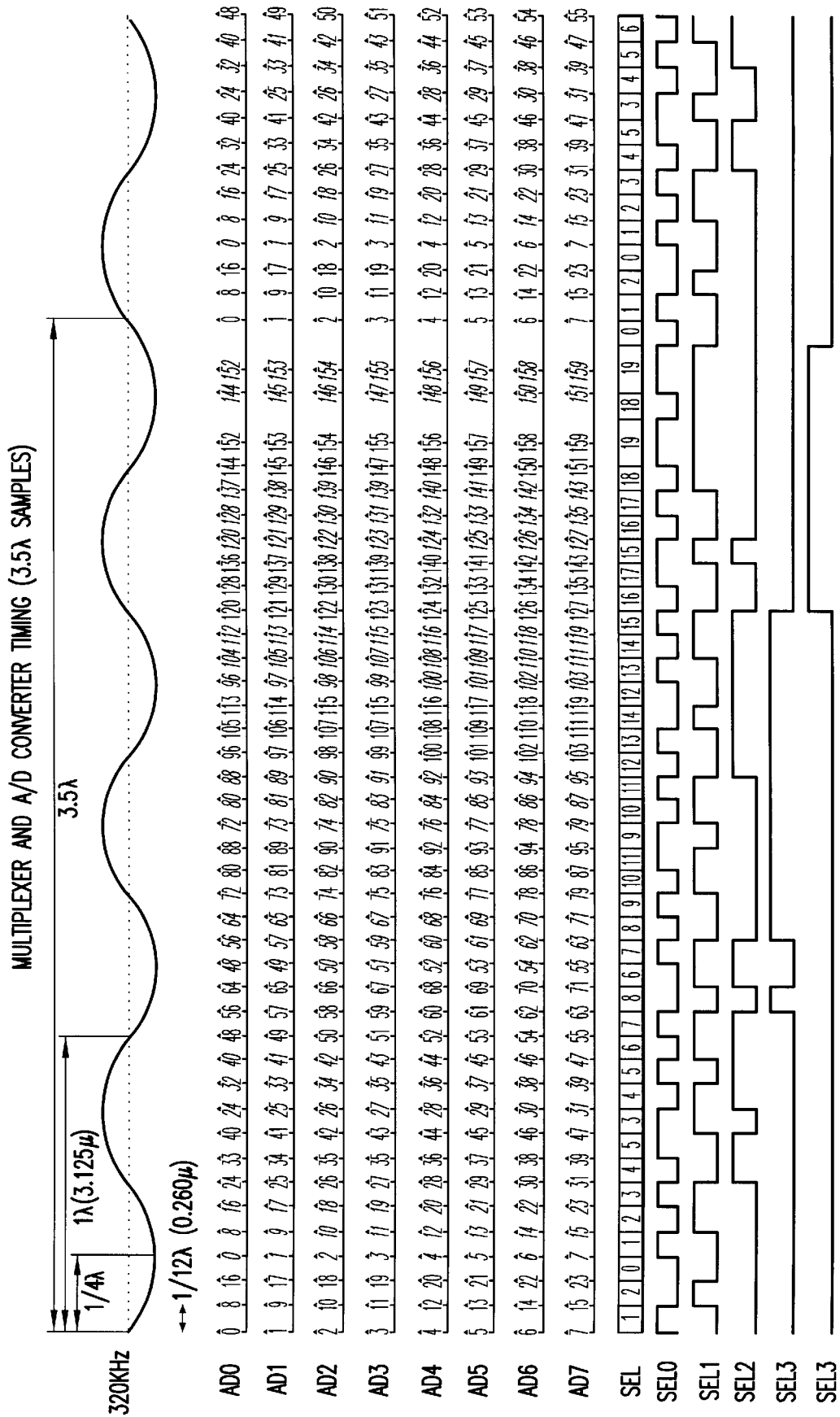
FIG. 8 is a sampling timing chart showing the operation of the A/D converters according to a variation of the embodiment.
Figure 9:
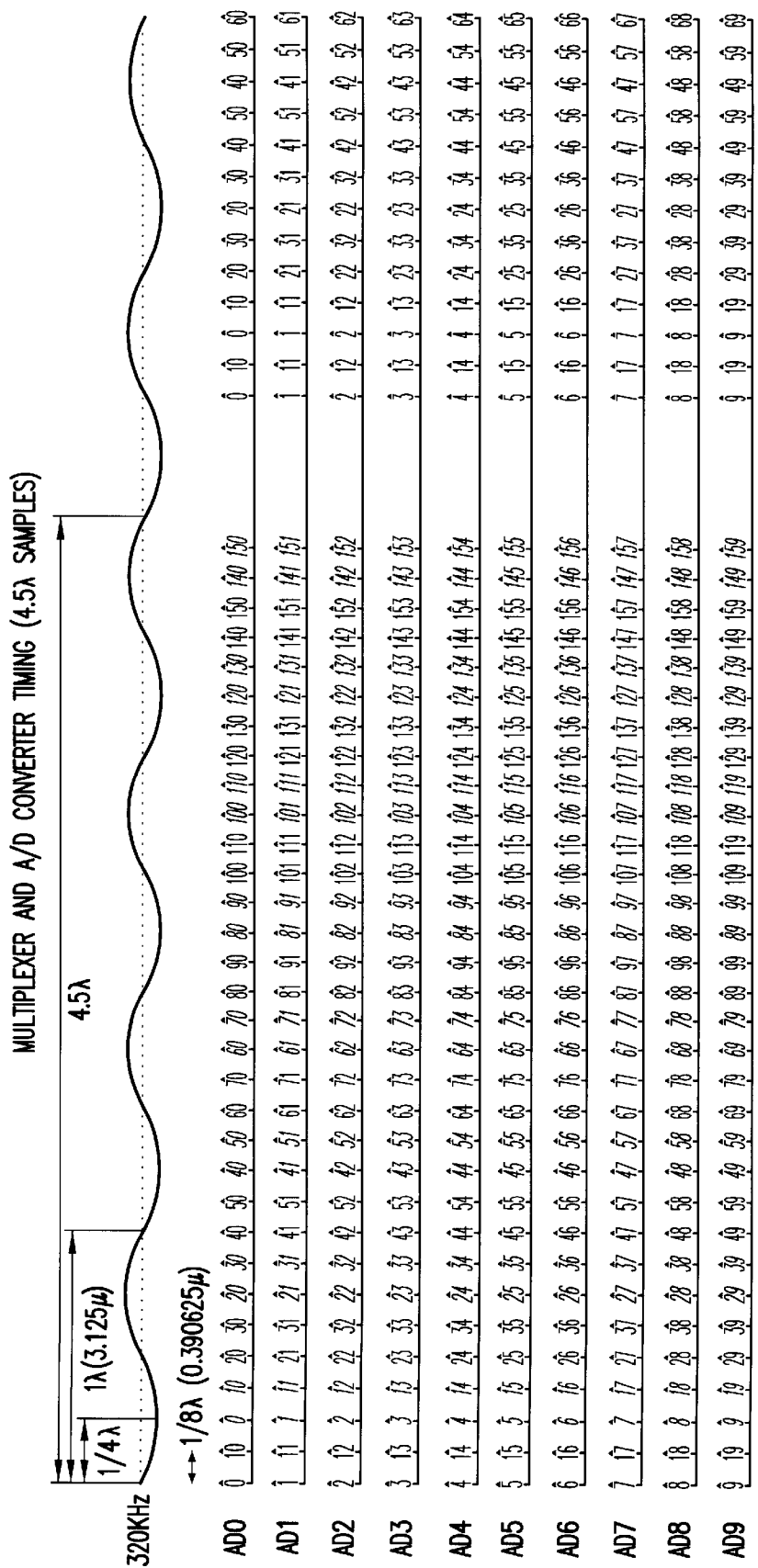
FIG. 9 is a sampling timing chart showing the operation of the A/D converters according to another variation of the embodiment.
Figure 10A:
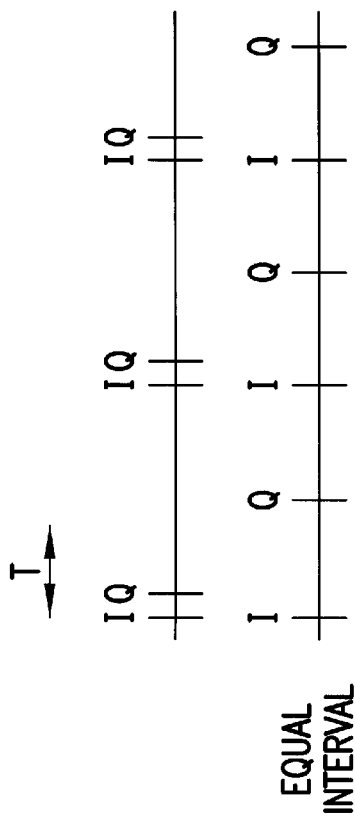
FIG. 10A is a diagram showing an interval between in-phase data and quadrature data sampling times.
Figure 10B:
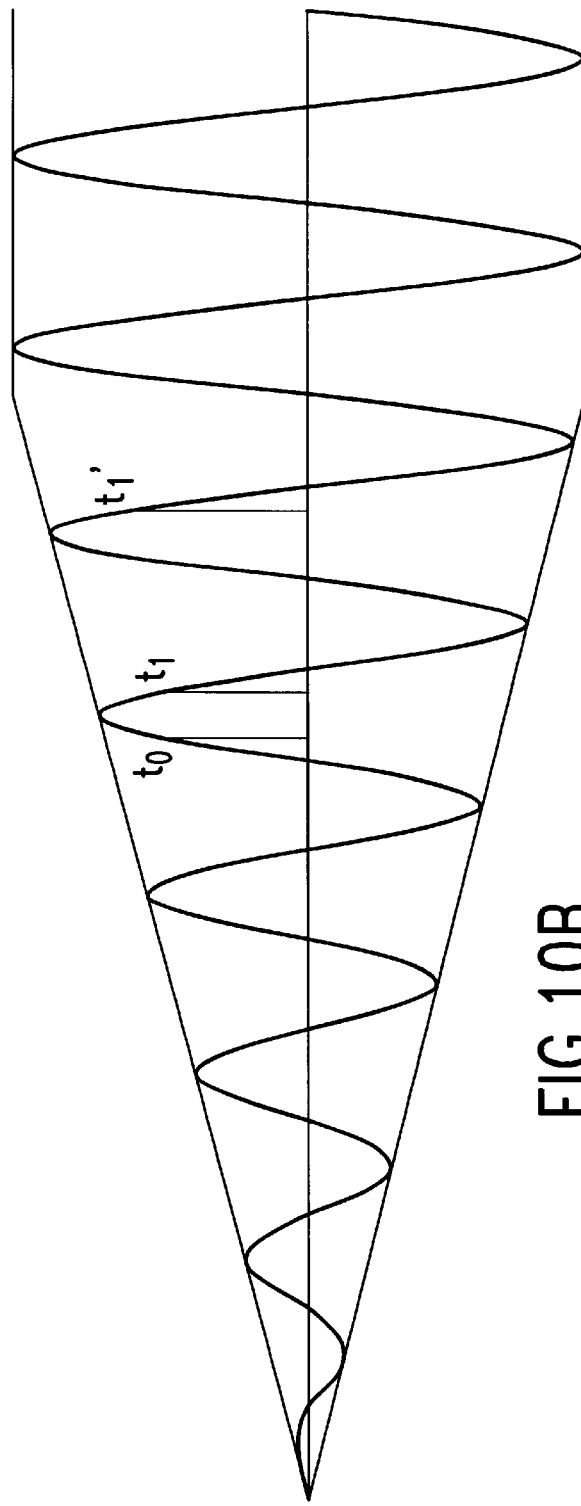
FIG. 10B illustrates an example where the phase of the sample data is 45°.

Although the data of the 160 channels are multiplexed by using 10 lines of the multiplexers 17 and the A/D converters 19 and repeatedly sampled at 4λ time intervals as shown in FIG. 4 in the foregoing embodiment, the data may be multiplexed into 8 lines and sampled at 3.5λ time intervals as shown in FIG. 8. Alternatively, the data may be multiplexed into 10 lines and sampled at 4.5λ time intervals as shown in FIG. 9. In the case of FIG. 8, phase is inverted in a second sampling cycle compared to a first sampling cycle, and 0° sample data and 90° sample data, and 180° sample data and 270° sample data are obtained during the first and second sampling cycles. In the case of FIG. 9, two data are obtained in one sampling cycle, but the phase is inverted in the succeeding sampling cycle.

What is claimed is:

1. A signal processing method comprising the steps of:
   receiving signals of a specific frequency f which is equal to 1/T where T is the period of the signals;
   sampling said signals at a specific first sampling time instant and at a sampling time instant (a+1/4)T after said first sampling time instant where a is 0 or an integer multiple of 0.5; and
   outputting data sampled at said sampling time instants as in-phase data and quadrature data of complex-valued sample data,
   wherein the time interval of (a+1/4)T is smaller than half the recurrence interval of a point of said specific first sampling time instant.

2. A signal processing method comprising the steps of:
   receiving signals of a specific frequency f which is equal to 1/T where T is the period of the signals;
   sampling said signals at a specific first sampling time instant, at a sampling time instant (n+1/4)T after said first sampling time instant, at a sampling time instant (n+1/2)T after said first sampling time instant and at a sampling time instant (n+3/4)T after said first sampling time instant to produce 0° sample data, 90° sample data, 180° sample data and 270° sample data respectively, where n is 0 or a positive integer; and
   outputting a value obtained by averaging said 0° sample data and said 180° sample data as in-phase data of complex-valued sample data and a value obtained by averaging said 90° sample data and said 270° sample data as quadrature data of said complex-valued sample data,
   wherein the time interval of (n+1/4)T is smaller than one quarter of the recurrence interval of a point of said specific first sampling time instant.

3. A signal processing device comprising:
   a plurality of signal input means;
   a plurality of multiplexers which multiplex signals entered from said signal input means into a smaller number of channels having output terminals than the number of said signal input means, wherein said multiplexers operate with synchronized switching timing; and
   a plurality of A/D converters respectively connected to the output terminals of the multiplexers which convert analog signals entered respectively and individually from said multiplexers into digital form, wherein said A/D converters operate with synchronized sampling timing.

4. A signal processing device comprising:
   a plurality of signal input means for inputting signals having a specific frequency;
   a plurality of multiplexers which multiplex the signals entered from said signal input means into a smaller number of channels having output terminals than the number of said signal input means, wherein said multiplexers operate with synchronized switching timing;
   a plurality of A/D converters respectively connected to the output terminals of the multiplexers which convert analog signals entered respectively and individually from said multiplexers into digital form, wherein said A/D converters operate with synchronized sampling timing; and
   a phase shifter which shifts the phases of individual sample data such that a specific phase relationship is established between the data sampled by said A/D converters.

5. A sonar system which emits an ultrasonic search pulse signal and receives echo signals by receiving beams formed successively and oriented in successively varying directions, said sonar system comprising:
   a plurality of transducer elements for receiving echo signals of a specific frequency f which is equal to 1/T where T is the period of the echo signals;
   a plurality of multiplexers which multiplex signals entered from said transducer elements into a smaller number of channels than the number of said transducer elements, wherein said multiplexers operate with synchronized switching timing;
   a plurality of A/D converters which convert analog signals entered respectively and individually from said multiplexers into digital form, wherein said A/D converters operate with synchronized sampling timing and sample said analog signals at a specific first sampling time instant, at a sampling time instant (n+1/4)T after said first sampling time instant, at a sampling time instant (n+1/2)T after said first sampling time instant and at a sampling time instant (n+3/4)T after said first sampling time instant to produce 0° sample data, 90° sample data, 180° sample data and 270° sample data respectively, where n is 0 or a positive integer;
   outputting a value obtained by averaging said 0° sample data and said 180° sample data as in-phase data of complex-valued sample data and a value obtained by averaging said 90° sample data and said 270° sample data as quadrature data of said complex-valued sample data;
   a phase shifter shifts the phases of individual sample data such that a specific phase relationship is established between the complex-valued sample data derived from said individual transducer elements; and a matched filter for receiving the complex-valued sample data from said phase shifter and successively forming the receiving beams in different directions.

6. A sonar system which emits an ultrasonic search pulse signal and receives echo signals by receiving beams formed successively and oriented in successively varying directions, said sonar system comprising:

a plurality of transducer elements for receiving echo signals of a specific frequency;

a plurality of multiplexers which multiplex signals entered from said transducer elements into a smaller number of channels than the number of said transducer elements, wherein said multiplexers operate with synchronized switching timing;

a plurality of A/D converters which convert analog signals entered respectively and individually from said multiplexers into digital form, wherein said A/D converters operate with synchronized sampling timing and sample said analog signals for a plurality of waves thereof from said transducer elements to produce 0° sample data, 90° sample data, 180° sample data and 270° sample data of echo signals from each of said transducer elements respectively;

outputting a value obtained by averaging said 0° sample data and said 180° sample data as in-phase data of complex-valued sample data and a value obtained by averaging said 90° sample data and said 270° sample data as quadrature data of said complex-valued sample data;

a phase shifter shifts the phases of individual sample data such that a specific phase relationship is established between the complex-valued sample data derived from said individual transducer elements; and a matched filter for receiving the complex-valued a sample data from said phase shifter and successively forming the receiving beams in different directions.

7. A sonar system which emits an ultrasonic search pulse signal and receives echo signals by receiving beams formed successively and oriented in successively varying directions, said sonar system comprising:

a plurality of transducer elements for receiving echo signals of a specific frequency;

a plurality of multiplexers which multiplex signals entered from said transducer elements into a smaller number of channels than the number of said transducer elements;

a plurality of A/D converters which convert analog signals entered respectively and individually from said multiplexers into digital form;

means for successively generating in a sequential order in-phase data of complex-valued sample data and quadrature data of complex-valued sample data from the digital signals; and a matched filter for receiving the complex-valued sample data from said generating means and successively forming the receiving beams in different directions.

8. A sonar system which emits an ultrasonic search pulse signal and receives echo signals by receiving beams formed successively and oriented in successively varying directions, said sonar system comprising:

a plurality of groups of transducer elements for receiving echo signals of a specific frequency f which is, equal to 1/T where T is the period of the echo signals;

a plurality of multiplexers which multiplex signals entered successively from each of said groups of the transducer elements into a smaller number of channels than the number of said transducer elements, wherein said multiplexers operate with synchronized switching timing;

a plurality of A/D converters which convert analog signals entered respectively and individually from said multiplexers into digital form, wherein said A/D converters operate with synchronized sampling timing and repeatedly sample said analog signals from said each of the groups of the transducer elelments at a specific first sampling time instant, at a sampling time instant 1/4·T after said first sampling time instant, at a sampling time instant 1/2·T after said first sampling time instant and at a sampling time instant 3/4·T after said first sampling time instant to produce 0° sample data, 90° sample data, 180° sample data and 270° sample data respectively;

outputting a value obtained by averaging said 0° sample data and said 180° sample data as in-phase data of complex-valued sample data and a value obtained by averaging said 90° sample data and said 270° sample data as quadrature data of said complex-valued sample data;

a phase shifter shifts the phases of individual sample data such that a specific phase relationship is established between the complex-valued sample data derived from said individual transducer elements; and a matched filter for receiving the complex-valued sample data from said phase shifter and successively forming the receiving beams in different directions.

9. A sonar system which emits an ultrasonic search pulse signal and receives echo signals by receiving beams formed successively and oriented in successively varying directions, said sonar system comprising:

a plurality of groups of transducer elements for receiving echo signals of a specific frequency;

a plurality of multiplexers which multiplex signals entered successively from each of said groups of the transducer elements into a smaller number of channels than the number of said transducer elements, wherein said multiplexers operate with synchronized switching timing;

a plurality of A/D converters which convert analog signals entered respectively and individually from said multiplexers into digital form, wherein said A/D converters operate with synchronized sampling timing;

means for generating in-phase data of complex-valued sample data and quadrature data of complex-valued sample data from the digital signals; and a matched filter for receiving the in-phase data of complex-valued sample data and quadrature data of complex-valued sample data from said generating means and successively forming the receiving beams in different directions.

10. A sonar system which emits an ultrasonic search pulse signal and receives echo signals by receiving beams formed and oriented in varying directions, said sonar system comprising:

a plurality of transducer elements;

a plurality of multiplexers which multiplex signals supplied from said transducer elements into a smaller number of channels having output terminals than the number of said transducer elements, wherein said multiplexers operate with synchronized switching timing; and a plurality of A/D converters respectively connected to the output terminals of the multiplexers which convert analog signals entered respectively and individually from said multiplexers into digital form, wherein said A/D converters operate with synchronized sampling timing.

11. A signal processing method comprising the steps of:

receiving signals of a specific frequency f which is equal to 1/T where T is the period of the signals;

sampling said signals at a specific first sampling time instant and at a sampling time instant (n+1/4)T after said first sampling time instant where n is 0 or an integer; and outputting data sampled at said sampling time instants as in-phase data and quadrature data of complex-valued sample data, wherein the recurrence interval of said two sampled signals produced at the time interval of (n+1/4)T is (m+1/2)T where m is an integer and m>n.

12. A sonar system which emits an ultrasonic search pulse signal and receives echo signals by receiving beams formed successively and oriented in successively varying directions, said sonar system comprising:

a plurality of transducer elements;

a plurality of multiplexers which multiplex signals supplied from said transducer elements into a smaller number of channels having output terminals than the number of said transducer elements, wherein said multiplexers operate with synchronized switching timing;

a plurality of first comparatively narrow-band amplifiers incorporated between said plurality of transducer elements and said plurality of multiplexers respectively;

a plurality of A/D converters which respectively connect to output terminals of the multiplexers which convert analog signals entered respectively and individually from said multiplexers into digital form, wherein said A/D converters operate with synchronized sampling timing; and a plurality of second comparatively broad-band amplifiers incorporated between said plurality of multiplexers and said plurality of A/D converters respectively.

13. The signal processing method according to claim 11, wherein the time interval of (n+1/4)T is smaller than one quarter of the recurrence interval of a point of said specific first sampling time interval.

14. The sonar system of claim 5 further comprising:

a plurality of first comparatively narrow-band amplifiers incorporated between said plurality of transducer elements and said plurality of multiplexers respectively; and a plurality of second comparatively broad-band amplifiers incorporated between said plurality of multiplexers and said plurality of A/D converters respectively.

15. The sonar system of claim 6, further comprising:

a plurality of first comparatively narrow-band amplifiers incorporated between said plurality of transducer elements and said plurality of multiplexers respectively; and a plurality of second comparatively broad-band amplifiers incorporated between said plurality of multiplexers and said plurality of A/D converters respectively.

16. The sonar system of claim 7, further comprising:

a plurality of first comparatively narrow-band amplifiers incorporated between said plurality of transducer elements and said plurality of multiplexers respectively; and a plurality of second comparatively broad-band amplifiers incorporated between said plurality of multiplexers and said plurality of A/D converters respectively.

17. The sonar system of claim 8, further comprising:

a plurality of first comparatively narrow-band amplifiers incorporated between said plurality of transducer elements and said plurality of multiplexers respectively; and a plurality of second comparatively broad-band amplifiers incorporated between said plurality of multiplexers and said plurality of A/D converters respectively.

18. The sonar system of claim 9, further comprising:

a plurality of first comparatively narrow-band amplifiers incorporated between said plurality of transducer elements and said plurality of multiplexers respectively; and a plurality of second comparatively broad-band amplifiers incorporated between said plurality of multiplexers and said plurality of A/D converters respectively.

19. The sonar system of claim 10, further comprising:

a plurality of first comparatively narrow-band amplifiers incorporated between said plurality of transducer elements and said plurality of multiplexers respectively; and a plurality of second comparatively broad-band amplifiers incorporated between said plurality of multiplexers and said plurality of A/D converters respectively.

20. The signal processing method of claim 1, wherein the recurrence interval of said two sampled signals produced at a time interval of (n+1/4)T is (m+1/2)T where n is 0 or an integer and m is an integer and m>n.

21. The signal processing method of claim 2, wherein the recurrence interval of said two sampled signals produced at a time interval of (n+1/4)T is (m+1/2)T where n is 0 or an integer and m is an integer and m>n.

* * * * *